3,044,952
ABSORBER STRIPPER AND PROCESS
George P. Baumann, Metuchen, and Charles R. Lipuma, Newark, N.J., assignors to Esso Research and Engineering Company, a corporation of Delaware
Filed Dec. 29, 1958, Ser. No. 783,434
19 Claims. (Cl. 208—82)

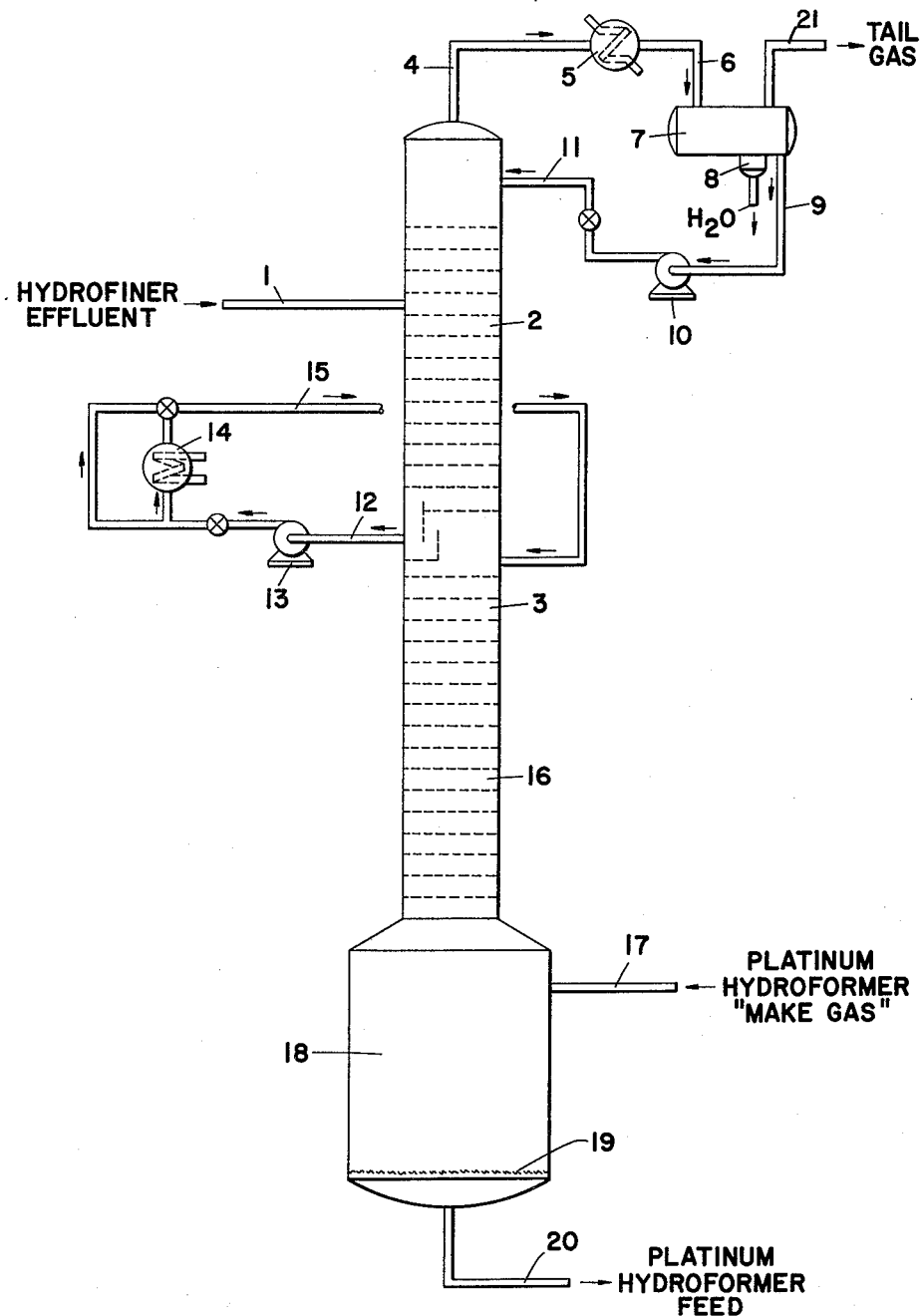

The present invention relates to an improved combination hydrofining followed by platinum hydroforming process. More particularly, it relates to obtaining extremely low water and $H_2S$ levels in the hydrofinate stream passed to platinum hydroforming and at the same time to obtaining a complete absorption in said stream of the light ends, i.e. hydrocarbons from the platinum hydroformer "make" or excess recycle gas. Most particularly, it relates to passing the hydrofined naphtha downwardly through an absorber stripper countercurrent to the hydroformer "make" gas rising in the absorber stripper and operating the stripper or upper section of the column at temperatures of 150°–350° F., preferably 200–300° F. on the top or feed tray of the stripper section, cooling the downflowing liquid and operating the absorber or lower section of the column at temperatures of 80°–175° F., preferably 100–150° F. on the bottom tray of the absorber section.

Hydroforming is a well known and widely used process for upgrading hydrocarbon fractions boiling in the motor gasoline or naphtha boiling range to increase their octane number and to improve their burning or engine cleanliness characteristics. In hydroforming the hydrocarbon fraction or naphtha is contacted at elevated temperatures and pressures and in the presence of hydrogen or hydrogen rich process gas with solid catalytic materials under conditions such that there is no net consumption of hydrogen and ordinarily there is a net production of hydrogen in the process.

Hydroforming operations are ordinarily carried out at temperatures of 750°–1050° F. in the pressure range of about 50 to 1000 p.s.i.g. and in contact with such catalyst as platinum, molybdenum oxide, chromium oxide or in general oxides or sulfides of metals of groups IV, V, VI, VII and VIII of the periodic system of elements alone or generally supported on a base or spacing agent such as alumina gel, precipitated alumina or zinc aluminate spinel. A good platinum hydroforming catalyst is one employing an alcoholate alumina base preferably on eta alumina carrying 0.3–0.6% by weight of platinum. Catalysts of lower or higher platinum content may also be used. Additionally silica-alumina based catalysts can be used but they are somewhat less active.

Hydrofining is defined as an operation in which petroleum hydrocarbons are contacted with hydrogen in the presence of a catalyst at pressures of less than about 1000 p.s.i.g. and temperatures of less than about 800° F. in order to improve their quality or to prepare them for further processing. The reactions taking place under these conditions are desulfurization, removal of nitrogen and/or oxygen, and hydrogenation of unsaturated compounds. The combined results of all these reactions and a characteristic of the hydrofining process is the net consumption of hydrogen occurring therein.

It has of late been discovered that extremely low levels of water are very desirable in platinum hydroforming. It is therefore important that the naphtha feed stream to platinum hydroforming be dried to very low levels of water. It is also known that the $H_2S$ present after conventional hydrofining usually amounts to about one third of the total sulfur present. It is therefore obvious that improved stripping of water and $H_2S$ from the hydroformer feed stream is very advantageous. With respect to the recovery of light ends present in hydroformer "make gas," i.e. excess hydrogen-containing recycle gas made in the process it is well known that large amounts of valuable gasoline $C_5+$ material as well as light ends are present in recycle gas and that this material must be recovered from the "make gas" for economical operation of the process. It is also known that it is advantageous to have the light ends recycled to the hydroformer to supply sensible heat to the process and for other reasons.

It has now been found that conventional absorber strippers cannot be operated to obtain both the desired low levels of water and of $H_2S$ in the naphtha feed supplied to the platinum hydroformer and at the same time the complete recovery of the light ends contained in the "make gas." Thus, it was found that if the tower was operated at high temperatures efficient stripping could be obtained but with only very poor absorption of light ends. It was likewise found that where efficient absorption of light ends was obtained (at low temperatures) that only a poor stripping of water and of $H_2S$ was possible. It was in addition found that a prior drying of the feed to the hydrofiner was not a desirable solution to the problem since water is formed in the hydrofining operation itself.

The process of the present invention may be more fully understood from the following description read in conjunction with the drawing, illustrating a preferred method of carrying out the present invention. Turning to the drawing, the entire effluent from the hydrofiner is either passed directly via line 1 to the absorber-stripper after cooling to the desired temperature or the hydrofiner effluent is first cooled to about 100° F. and passed to a separator to separate out the hydrogen treat gas from the liquid hydrofined naphtha so as not to recycle this gas through the absorber-stripper and thence to the hydrofiner. If this is done, the separated liquid hydrofined naphtha must of course be reheated to the desired temperature for its supply via line 1 to the absorber-stripper column. In this case, liquid hydrofined naphtha is pumped into the absorber-stripper, operated at pressures higher than the hydrofiner, thus facilitating return of the hydrogen rich, treat gas to the hydrofiner. If the entire hydrocarbon effluent is sent directly to the absorber-stripper, either part of the platinum hydroformer make gas or the absorber stripper tail gas can be used as hydrofiner treat gas. Utilization of the lower hydrogen concentration make-gas will require higher hydrofiner pressures to maintain the necessary hydrogen partial pressure. The make gas can be supplied from either the suction or discharge of the reformer recycle gas compressor, depending on the hydrofiner pressure level. Utilization of the high hydrogen rich absorber-stripper tail gas requires additional, expensive compression facilities to boost its pressure level to that of the hydrofiner. In either event hydrofiner effluent is fed through line 1 at a temperature of 150°–350° F. preferably 200–300° F. to the upper part or stripping section 2 of absorber stripper 3. Absorber stripper 3 is operated at pressures of 150–400 p.s.i. In the case where the total hydrofiner effluent is passed to the absorber stripper this pressure is usually approximately the same as that utilized in the hydrofiner. As mentioned, where the hydrofiner treat gases are first separated from the liquid hydrofined naphtha the tower will be operated at a higher pressure than that of the hydrofiner. In the upper section of the tower, water and $H_2S$ are stripped from the downflowing liquid on the plates by platinum hydroformer make gas at temperatures in the range of 150°–350° F., preferably 200°–300° F. The vapors and gas rising in the column are then passed overhead through line 4 and are cooled to about 100° F. in overhead condenser 5. From condenser 5 the combined liquid-gas stream is passed through line 6 to separator 7 containing water knockout pot 8. Here the liquid hydrocarbons are separated and are refluxed back to the tower through line 9, pump 10 and line 11, the condensed water passes out through knockout pot 8, and tail gas passes overhead from the system through line 21. Part of this tail gas whether platinum hydroformer "make gas" alone or whether it is mixed with the hydrofiner tail gas (when separation ahead of the absorber stripper is not conducted) is used as the hydrogen treat gas for the hydrofining process. Liquid supplied through line 11 flows downwardly through the upper stripper section 2 of the column and is withdrawn from a plate in the middle section of the tower through line 12. It is then passed through pump 13 and through intercooler 14 and line 15, back to the column below the point at which it is removed. Thus, the temperature in the lower section 16 of the column is maintained at least 50° F., preferably at least 100° F., below the temperature existing in the upper section 2 of the column. Alternatively, of course, cooling coils may be arranged within the column to effect this cooling but swaging of the column would probably be required and otherwise this method is not as attractive.

In the lower section of the column the liquid hydrofined product descending on the plates is contacted at temperatures in the range of 80°–175° F. preferably 100–150° F. with rising platinum hydroformer "make gas" supplied through line 17. Thus, the ascending gas is stripped of essentially all the light ends present therein before it rises to stripping section 2 of the column and these materials are retained in the liquid which collects in the surge or storage section 18 of the column. This liquid material having level 19 is then withdrawn through line 20 and is passed after suitable heating to the platinum hydroforming reaction zone. In the platinum hydroforming operation recycle gas is separated from the cooled hydroformate in a separator, a part of this recycle gas is recycled to the hydroforming reaction zone and the remainder or excess gas designated as "make gas" is passed to the absorber stripper 3 through line 17 as previously described.

By the process of this invention the levels of water and of sulfur or hydrogen sulfide in the hydrofined naphtha feed stream to the platinum hydroformer are reduced to below 5–10 p.p.m., preferably below 3 p.p.m. of water and to below 5 to 10 p.p.m., preferably below 5 p.p.m. of hydrogen sulfide. Furthermore, the $C_2$–$C_5$ material recovered from the platinum hydroformer "make gas" in the absorber section of the column is up to 40% of the $C_2$, 98% of $C_3$, 100% of $C_4$ and 100% of $C_5$, depending on the economic attractiveness of the light hydrocarbon recovery.

The present invention will be defined and clarified from a consideration of the following examples.

EXAMPLE I

The following data were obtained on a conventional absorber stripper tower operating at a pressure of 225 p.s.i.g. in use in a commercial platinum hydroforming installation. The stripper section of the tower consisted of 14 plates and the absorber section consisted of 16 plates.

| Average Stripper Section Temperature, ° F. | Water Content in Stripper Bottoms, p.p.m. | $H_2S$ Content in Stripper Bottoms, p.p.m. |
| --- | --- | --- |
| 100 | [1] 90 |  |
| 105 | 78 | 5 |
| 135 | [1] 35 |  |
| 150 | [1] 24 |  |
| 200 | [1] 9 |  |
| 275 | 2–3 | less than 1 |
| 300 | [1] 2 |  |

[1] Predicted values at same operating conditions (except for temperature) obtained by interpolation.

EXAMPLE II

The following data were calculated based on the tower and operating conditions of Example I. These calculations were the conventional ones used in calculating absorber stripper light ends using Kremser charts.

*Average Absorber Section Temperature, ° F.*

|  | 105 | 275 |
| --- | --- | --- |
| Percent Recovery of: |  |  |
| $C_2$ | 41.8 | 18.2 |
| $C_3$ | 88.0 | 34.4 |
| $C_4$ | 99.5 | 53.6 |
| $C_5$ | 100.0 | 98.0 |

EXAMPLE III

A virgin naphtha from an Arabian crude boiling in the range of 165 to 310° F. containing 0.12 wt. percent sulfur and 300 parts per million of water is fed to a hydrofiner operating under the following conditions:

Temperature, 560° F.
Pressure, 255 p.s.i.g.
Hydrogen treat gas rate, 400 s.c.f./b.
Liquid hydrocarbon space velocity, 2 v./hr./v.

The treat gas used in the hydrofining zone is platinum hydroformer make gas obtained from the top of an absorber stripper as described in the drawing. Hydrofinate is passed to a separator operating at 100° F. and the separated hydrofinate is pressured and heated and is supplied at a temperature of 300° F. to the absorber stripper 3 operating at a pressure of 270 p.s.i.g. Absorber stripper 3 contains 30 plates with the intercooler stream being withdrawn at plate 17 and returned at plate 16. The reflux stream is supplied at the rate of 820 b./s.d., the intercooler stream is cooled to 90° F., the amount of liquid being withdrawn as total drawoff is 8830 b./s.d. Upper and lower sections of the tower are operated at temperatures of 275° F. for the top or feed tray of the stripper section and 105° F. for the bottom tray of the absorber section respectively and the liquid stream leaving the absorber section 3 is heated to a temperature of 980° F. and is supplied to a platinum hydroformer operating at a pressure of 350 p.s.i.g., feed rate of 10,110 b./s.d. and a recycle gas rate of 6000 s.c.f./b. of fresh feed. Excess recycle gas or make gas is supplied to the bottom of the absorber stripper through line 17 at a rate of 10.54 MM s.c.f./s.d. The level of $H_2S$ and of water in the feed to the hydroformer is less than 1 p.p.m. and 3 p.p.m. respectively and the make gas rising to section 2 of the tower has only 10.5 mol percent of the original $C_2$ to $C_5$ material present. The recoveries are 41.8% $C_2$, 88.0% $C_3$, 99.5% $C_4$ and 100% $C_5$, all of which of course being passed back to the platinum hydroformer.

The foregoing description contains a limited number of embodiments of the present invention. It will be understood, however, that this invention is not limited thereto since numerous variations are possible without departing from the scope of the following claims.

What is claimed is:

1. In a platinum hydroforming operation wherein the naphtha feed to the hydroformer is first hydrofined and the hydrofinate stream is passed down through an absorer stripper column to strip water vapor and $H_2S$ from the hydrofinate stream prior to its introduction into the hydroformer and at the same time absorb light ends from the hydroformer make gas in said hydrofinate stream, the improvement which comprises operating the stripper or upper section of the column at a temperature between about 150° F. and 350° F. for the top or feed tray, and cooling the liquid hydrofinate passing down the column so as to operate the lower, absorber section of the column at a temperature at least 50° F. cooler than the upper, stripper section of the column and in the range of 80–175° F. for the bottom tray of the absorber section and withdrawing substantially water-free naphtha feed from the lower portion of said column.

2. The process of claim 1 in which cooling of the liquid hydrofinate passing down the column is obtained by withdrawing a liquid hydrofinate stream from a plate in the middle section of the column, externally cooling the liquid hydrofinate stream, and recycling the cooled liquid hydrofinate steam to a plate lower in the column than the one from which it was withdrawn.

3. The process of claim 1 in which the lower, absorber section of the column is operated at a temperature at least 100° F. cooler than the upper stripper section of the column.

4. The process of claim 3 in which cooling of the liquid hydrofinate passing down the column is obtained by withdrawing a liquid hydrofinate stream from a plate in the middle section of the column, externally cooling the liquid hydrofinate stream, and recycling the cooled hydrofinate stream to a plate lower in the column than the one from which it was withdrawn.

5. The process of claim 1 in which the colnmn is operated at a pressure between about 150 p.s.i.g. and 400 p.s.i.g.

6. The process of claim 1 in which the column is operated at a pressure between about 150 p.s.i.g. and 400 p.s.i.g., the upper stripper section of the column is operated at a temperature between about 200° F. and 300° F. and the lower absorber section of the column is operated at a temperature between about 100° F. and 150° F.

7. The process of claim 1 in which the entire stream from the hydrofining step is passed directly to the absorber stripper column and in which a part of the tail gas from the top of the absorber stripper is compressed and recycled to the hydrofining step.

8. The process of claim 1 in which hydrofiner hydrogen treat gas is separated from the liquid hydrofinate stream prior to the introduction of said hydrofinate stream into the absorber stripper column and in which the absorber stripper column is operated at a pressure higher than that of the hydrofining step so that hydrogen rich tail gas from the top of the absorber stripper may be supplied directly to the hydrofining step.

9. In a platinum hydroforming process wherein the naphtha feed to the hydroformer is first hydrofined and the liquid hydrofinate stream is introduced into the stripper upper section of a stripper absorber zone in which the stripper section is above said absorber section to remove water vapor from the hydrofinate stream prior to its introduction into said hydroformer and at the same time to absorb light ends in said downflowing liquid hydrofinate stream from the upflowing hydroformer make gas introduced into the bottom portion of the absorber section of said stripper absorber zone and hydrogen-containing gas is taken overhead from said stripper section and substantially water-free naphtha hydroformer feed is withdrawn from the bottom of said absorber section, the improvement which comprises operating the stripper upper section of said stripper absorber zone at a temperature between about 150° F. and 350° F., cooling the liquid hydrofinate stream flowing downwardly through said stripper absorber zone before it reaches said lower absorber section so as to operate the lower absorber section of said stripper absorber zone at a temperature at least 50° F. cooler than said stripper upper section and in the range between about 80° F. and 175° F.

10. In a platinum hydroforming process wherein the naphtha feed to the hydroformer is first hydrofined and the liquid hydrofinate stream is introduced into the stripper upper section of a stripper absorber zone in which the stripper section is above said absorber section to remove water vapor from the hydrofinate stream prior to its introduction into said hydroformer and at the same time to absorb light ends in said downflowing liquid hydrofinate stream from the upflowing hydroformer make gas introduced into the bottom portion of the absorber section of said stripper absorber zone and hydrogen-containing gas is taken overhead from said stripper section and substantially water-free naphtha hydroformer feed is withdrawn from the bottom of said absorber section, the improvement which comprises operating the stripper upper section of said stripper absorber zone at a temperature above between 150° F. and 350° F., withdrawing a liquid hydrofinate stream from the lower portion of said stripper section of said stripper absorber zone, externally cooling said withdrawn hydrofinate stream and passing the cooled hydrofinate stream to the upper portion of said absorber section of said stripper absorber zone for downward passage therethrough to operate said absorber section at a temperature at least 50° F. cooler than said stripper upper section and recycling at least part of the hydrogen-containing gas taken overhead from said stripper absorber zone to said hydrofining step.

11. A process according to claim 9 wherein hydrogen-containing gas is separated from said liquid hydrofinate stream prior to introducing said hydrofinate stream into said stripper section and wherein said stripper absorber zone is maintained at a pressure higher than that in said hydrofining step so that hydrogen-rich gas passing overhead from said stripper section may be supplied to said hydrofining step.

12. A process according to claim 9 wherein the stripper absorber zone is maintained at a pressure between about 150 and 400 p.s.i.g.

13. In a platinum hydroforming process wherein the naphtha feed to the hydroformer is first hydrofined and the liquid hydrofined stream is introduced into the upper section of a stripping zone for downward flow therethrough countercurrent to upflowing gas to remove water vapor from the hydrofined stream prior to its introduction into said hydroformer and the hydrofined stream is passed down from said stripping zone through an absorber zone to absorb low molecular weight hydrocarbons in said liquid hydrofined stream from hydroformer make gas introduced into the bottom portion of said absorber zone and passing up through said absorber zone and then up through said stripping zone and hydrogen-containing gas is taken overhead from said stripping zone and substantially water-free hydrofined hydroformer feed is withdrawn from the bottom of said absorber zone, the improvement which comprises operating said stripping zone at a temperature between about 150° F. and 350° F. and under superatmospheric pressure, cooling a portion of the downflowing liquid hydrofined stream and passing the cooled liquid hydrofined stream to the upper portion of said absorber zone for downward flow therethrough to maintain said absorber zone at a temperature at least 50° F. cooler than said stripping zone and in the range between about 80° F. and 175° F. and under superatmospheric pressure.

14. A process according to claim 13 wherein the cooling of said hydrofined stream is carried on externally of said absorber zone.

15. A process according to claim 13 wherein hydrofined liquid is withdrawn from the bottom portion of said stripping zone, cooled and then returned to the upper portion of said absorber zone.

16. A process according to claim 13 wherein the temperature in said stripping zone is between about 200° F. and 300° F. and the temperature in said absorber zone is between about 100° F. and 175° F. and the pressure in said stripping and absorber zones is between about 150 p.s.i.g. and 400 p.s.i.g.

17. A method of contacting gases and liquid hydrocarbons which comprises introducing a stream of hydrofined liquid hydrocarbon hydroformer feed into the upper portion of a stripping zone for downward flow therethrough countercurrent to an upflowing gas and maintaining said stripping zone at an elevated temperature to remove water as vapor from said hydrofined stream, cooling a hydrofined liquid hydrocarbon hydroformer stream withdrawn from said stripping zone and introducing the cooled stream into the upper portion of an absorber zone maintained at a lower temperature than said stripping zone and for downward flow therethrough, introducing hydroformer make gas containing low molecular weight hydrocarbons and hydrogen into the bottom portion of said absorber zone for upward passage therethrough, passing gas from the upper portion of said absorber zone to the bottom portion of said stripping zone for upward flow therethrough countercurrent to the downflowing liquid, removing water vapor and hydrogen-containing gas overhead from said stripping zone, absorbing low molecular weight hydrocarbons from said hydroformer make gas in said absorber zone in said downflowing hydrofined liquid hydrocarbon feed and withdrawing a substantially water-free hydrofined hydroformer feed from the bottom portion of said absorber zone.

18. A method according to claim 17 wherein the temperature in said stripping zone is between about 200° F. and 300° F. and the temperature in said absorber zone is between about 100° F. and 175° F.

19. A method according to claim 17 wherein a stream of hydrocarbon liquid is withdrawn from the lower portion of said stripping zone, cooled externally of said stripping zone and the cooled stream of hydrocarbon liquid is introduced into the upper portion of said absorber zone for downward flow therethrough.

References Cited in the file of this patent
UNITED STATES PATENTS

| | | |
|---|---|---|
| 2,288,453 | Hill | June 30, 1942 |
| 2,335,531 | Praeger | Nov. 30, 1943 |
| 2,758,068 | Howard | Aug. 7, 1956 |
| 2,766,179 | Fenske et al. | Oct. 9, 1956 |
| 2,877,099 | Bowles | Mar. 10, 1959 |